US008222175B2

(12) United States Patent
Bartke et al.

(10) Patent No.: US 8,222,175 B2
(45) Date of Patent: Jul. 17, 2012

(54) PROCESS FOR THE PREPARATION OF AN OLEFIN POLYMERISATION CATALYST

(75) Inventors: Michael Bartke, Halle (DE); Peter Denifl, Gries am Brenner (AT)

(73) Assignee: Borealis Technology Oy, Porvoo (FI)

( * ) Notice: Subject to any disclaimer, the term of this patent is extended or adjusted under 35 U.S.C. 154(b) by 320 days.

(21) Appl. No.: 11/794,600

(22) PCT Filed: Dec. 22, 2005

(86) PCT No.: PCT/EP2005/013874
§ 371 (c)(1),
(2), (4) Date: Sep. 21, 2008

(87) PCT Pub. No.: WO2006/069733
PCT Pub. Date: Jul. 6, 2006

(65) Prior Publication Data
US 2009/0012247 A1    Jan. 8, 2009

(30) Foreign Application Priority Data

Dec. 31, 2004  (EP) ..................................... 04258193

(51) Int. Cl.
*C08F 4/602* (2006.01)
*C08F 4/6592* (2006.01)
*B01J 31/22* (2006.01)
(52) U.S. Cl. ........ 502/104; 502/103; 502/107; 502/118; 502/152; 526/160; 526/165; 526/943
(58) Field of Classification Search .................. 502/103, 502/104, 107, 118, 152; 526/124.3, 160, 526/165, 943
See application file for complete search history.

(56) References Cited

U.S. PATENT DOCUMENTS

| 4,517,307 A | 5/1985 | Cuffiani et al. ............... 502/119 |
| 6,291,013 B1 | 9/2001 | Gibson et al. ............... 427/213.3 |
| 6,294,496 B1 | 9/2001 | Diefenbach .................. 502/103 |

FOREIGN PATENT DOCUMENTS

| EP | 0255790 | 2/1988 |
| EP | 1273595 | 1/2003 |
| EP | 1323747 | 7/2003 |
| EP | 1375528 | 1/2004 |
| WO | WO 94/28034 | 12/1994 |
| WO | WO 97/10248 | 3/1997 |
| WO | WO 99/10353 | 3/1999 |
| WO | WO 99/41290 | 8/1999 |
| WO | WO 01/70395 | 9/2001 |
| WO | WO 02/48208 | 6/2002 |
| WO | WO 02/051544 | 7/2002 |
| WO | WO 02/060963 | 8/2002 |
| WO | WO 03/000754 | 1/2003 |
| WO | WO 03/000757 | 1/2003 |
| WO | WO 03/051934 | 6/2003 |
| WO | WO 03/106510 | 12/2003 |
| WO | WO 2004/029112 | 4/2004 |
| WO | WO 2006/069733 | 7/2006 |

OTHER PUBLICATIONS

Britovsek, G.J.P., et al., "The Search for New-Generation Olefin Polymerization Catalysts: Life Beyond Metallocenes," *Review in Agnew. Chem. Int. Ed.*, 38, 1999, 428-447.

*Primary Examiner* — Caixia Lu
(74) *Attorney, Agent, or Firm* — Ballard Spahr LLP

(57) ABSTRACT

This invention relates to a process for the preparation of an olefin polymerization catalyst, to the use of the catalyst in olefin polymerization and to the catalyst and polymers obtained. In particular, the invention relates to the preparation of a catalyst comprising an organometallic compound of a transition metal of Group 3 to 10 of the Periodic Table (IUPAC) by a semi-continuous or continuous process.

38 Claims, 4 Drawing Sheets

PROCESS FOR THE PREPARATION OF AN OLEFIN POLYMERISATION CATALYST

CROSS REFERENCE TO RELATED APPLICATIONS

The present application is a National Phase Application of International Application No. PCT/EP2005/013874, filed Dec. 22, 2005, which claims priority to European Patent Application No. 04258193.4, filed Dec. 31, 2004, which applications are incorporated herein fully by this reference.

This invention relates to a process for the preparation of an olefin polymerisation catalyst, to the use of the catalyst in olefin polymerisation and to the catalyst and polymers obtained. In particular, the invention relates to the preparation of a catalyst comprising an organometallic compound of a transition metal of Group 3 to 10 of the Periodic Table (IUPAC), or of an actinide or lanthanide, by a semi-continuous or continuous process.

BACKGROUND ART

Many processes and catalysts are known for the preparation of olefin polymers. Ziegler-Natta (ZN) catalyst compositions and chromium oxide compounds have, for example, been found to be useful in the preparation of polyolefins. Further, single-site catalysts (e.g. metallocenes) have been used and have been found to afford polymer properties not easily available by using ZN catalysts.

The first catalysts to be developed were homogeneous, i.e. they were used in solution in the polymerisation reaction. Due to the many drawbacks of homogeneous solution systems, several different approaches have been used to try to overcome the problems of the solution catalyst systems. Nowadays the most commonly used catalyst systems comprise heterogeneous catalysts, wherein catalyst components are supported on an external carrier. The carriers used have a porous structure in order to facilitate catalyst impregnation into the support. Carrier materials are typically polymeric or inorganic supports, most typically silica, alumina or magnesium dichloride based materials.

However, even the catalysts supported on external carriers have their drawbacks. The main drawbacks concern the inhomogeneity of the resulting catalyst. From the point of view of catalyst and polymer properties, one of the most important drawbacks of this kind of heterogeneous catalyst system is that it is difficult or even impossible to get solid catalyst particles, wherein the catalyst components are evenly distributed through the catalyst support. Furthermore, the inhomogeneity problem also exists between catalyst particles, i.e. intra and inter particle inhomogeneity problems occur. This is significant as the morphology of the support or carrier material has an essential effect on the catalyst and, due to the replica effect, also on the polymer morphology. Thus, any variations in catalyst distribution and morphology lead to differences in catalytic behavior in polymerisations and result in inconsistencies in the polymer product. In addition, use of an external support involves additional costs, the quality of the support must be carefully controlled, and still sometimes carrier residues might cause some problems.

A catalyst providing the advantages of both homogenous and heterogeneous catalysts is clearly desirable. Whilst it is generally believed that it is very difficult to obtain good polymer particle morphology using an olefin catalyst, which is not supported on an external support, the present Applicant previously found that polymers having a desirable particle morphology may be obtained using such a catalyst, which is in the form of solid particles (but in which an external carrier or support is absent). WO03/000754, WO03/000757, WO 03/051934 and WO03/106510, the contents of which are incorporated herein by reference, describe such catalysts and processes for producing them. The preparation of this kind of catalyst is based on a liquid/liquid emulsion system comprising at least two phases, from which the catalyst particles forming the dispersed phase of the emulsion, are solidified.

Solid catalysts are commonly prepared by using batch processes. However, the use of batch reactors causes problems in the resulting catalysts due to variations in the concentration of different components and in the physical conditions in the reactors with time. In addition there are inconsistencies between the different batches prepared. Moreover, in a batch process, the reactor volumes have to be large if catalysts are to be prepared on a commercial scale.

In the production of solid catalyst supported on an external carrier by a batch process there are also some additional problems. One solution for solving some of these problems during the preparation of Ziegler-Natta type catalysts supported on an external carrier is disclosed in WO02/48208. In the disclosed process the titanium compound is fed continuously into a vessel containing a suspension of a solid comprising a magnesium halide and further discharging liquid from the vessel. As a result a typical solid Ziegler-Natta type catalyst supported on an external carrier, which is especially used in propylene polymerization, is obtained. All temperatures and mixing conditions etc. have to be carefully selected in order to get the desired product. The process of this publication is, however, still far from a continuous process since it only describes a continuous method by which only one part of one step of the preparation of $MgCl_2$ based ZN catalyst can be carried out.

Also the solid catalysts obtained by the liquid/liquid emulsion technology referred to above have been prepared by a batch process comprising the following process steps:

(1) preparing a liquid/liquid emulsion comprising at least two phases, wherein a solution of catalyst component(s) in a solvent forms the dispersed phase in the form of droplets and a liquid medium immiscible therewith forms the continuous phase;
(2) solidifying said droplets from said dispersed phase, and optionally
(3) isolating said catalyst, Each of the steps (1)-(3) is described to be carried out in batch wise manner. However, the batch-wise processes disclosed in the above references cause additional problems in the above process and furthermore in the produced catalyst as well. Firstly, the process requires the transfer of the emulsion between two reactors. Because the stability of the emulsion is very limited, such transfers and any possible storage needed in between transfers will result in loss of material quality and amount. Further, the solidification is effected by changing the emulsion state by physical or chemical actions, i.e. by adding different chemicals or changing the physical conditions of the emulsion. In a batch-wise process, during the solidification, temperature and solvent concentration vary with time and thus temporal differences occur meaning that individual particles are exposed to different environments, which again leads to catalyst with undesired non-uniform particles and having uneven chemical composition distribution within the particles. Hence the end products obtained using such catalysts are of decreased quality. Also the hold-up of different reagents needed in the process is much higher in a batch process than in a continuous or semi-continuous process. In addition to these specific problems, drawbacks of common batch-wise processes relating e.g. to high reactor volumes in commercial production and common non-uniform products exist.

SUMMARY OF THE INVENTION

Due to the several common and more specific problems of the batch-wise catalyst preparation processes there is a need for improved processes for preparing olefin polymerization catalysts, especially for solid olefin catalysts, which are not supported on an external carrier, which processes lead to uniform catalyst particles and thus to uniform polymers having desired morphology. In particular there is a need for processes which can be operated easily and economically also in commercial scale essentially without any losses in catalyst quality and amount.

The present Applicant has surprisingly found that a process, wherein at least one of steps (1) to (3) of the above catalyst preparation process, is carried out in a continuous, rather than in a batch wise manner, overcomes these problems partly or totally.

Thus, according to the invention, the benefits achieved relate both to the product quality and operational, commercial and economical aspects of the process and products.

Thus viewed from a first aspect the invention provides an improved process for the preparation of an olefin polymerisation catalyst comprising an organometallic compound of a transition metal of Group 3 to 10 of the Periodic Table (IUPAC), or of an actinide or lanthanide in the form of solid particles comprising the following steps:
   (a) preparing a liquid/liquid emulsion comprising at least two phases, wherein a solution of catalyst component(s) in a solvent forms the dispersed phase in the form of droplets and a liquid medium immiscible therewith forms the continuous phase;
   (b) solidifying said droplets from said dispersed phase, and optionally
   (c) isolating said catalyst,
   wherein at least one of the steps (a) to (c) of the process is carried out continuously.

The overall process can thus be a semi-continuous or continuous process.

Viewed from another aspect the invention provides a catalyst obtainable by (e.g. obtained by) a process as hereinbefore described.

Viewed from a further aspect the invention provides the use of the catalyst as hereinbefore described in olefin polymerisation.

Viewed from a yet further aspect the invention provides a process for the preparation of polyolefin comprising polymerizing at least one olefin in the presence of an olefin polymerisation catalyst as hereinbefore defined. The polyolefin obtainable by a process as hereinbefore described forms still another aspect of the invention.

The term "semi-continuous" as used herein in relation to the process refers to methods wherein one or two steps of steps (a) to (c) are carried out in a continuous, rather than a batch wise, manner. The term "continuous" as used herein in relation to the process refers to methods wherein each of steps (a) (b) and (c) are carried out in a continuous, rather than batch wise manner. In a preferred process, step (a) or (b), i.e. the emulsification or solidification step is carried out continuously. A more preferred embodiment is that steps (a) and (b) are carried out continuously. And finally, if all steps of (a), (b) and (c) are carried out in a continuous working apparatus, the process is fully continuous giving the most advantageous result.

By a continuous step (a), (b) or (c) is meant a step wherein the materials needed for that step are fed continuously (i.e. non-stop) into the reactors or apparatus used in that step and the resulting product is removed continuously from said reactors/apparatus. The total residence time of any step is preferably adjustable.

For example, in a continuous step (a), a solution of catalyst component(s), liquid medium immiscible therewith as well as any optional materials are fed non-stop into a reactor and the resulting emulsion which is produced is removed non-stop from said reactor. Similarly in a continuous step (b) the emulsion produced in step (a) is fed non-stop into a reactor for solidification and the resulting suspension is removed non-stop from the reactor. If both of steps (a) and (b) are run continuously then the emulsion from step (a) is fed directly from the reactor of step (a) into the reactor of step (b). In a continuous step (c), the suspension produced in step (b) is fed continuously into an isolation apparatus and the resulting catalyst is, preferably continuously, withdrawn therefrom.

One of the main advantages of the invention is, as mentioned above, that the detrimental transfer of the emulsion having a limited stability can be avoided. Further, the preparation steps can be run in constant conditions. Any changes in physical conditions or chemical concentrations in the reactors in a continuous process are independent of time, which again supports the formation of desired homogeneous products. Further, smaller reactors can be used due to the improved hold-up volumes.

DESCRIPTION OF THE INVENTION

In the following the invention is described in more detail. Reference is also made to FIGS. 1 to 7.

Figure 1:
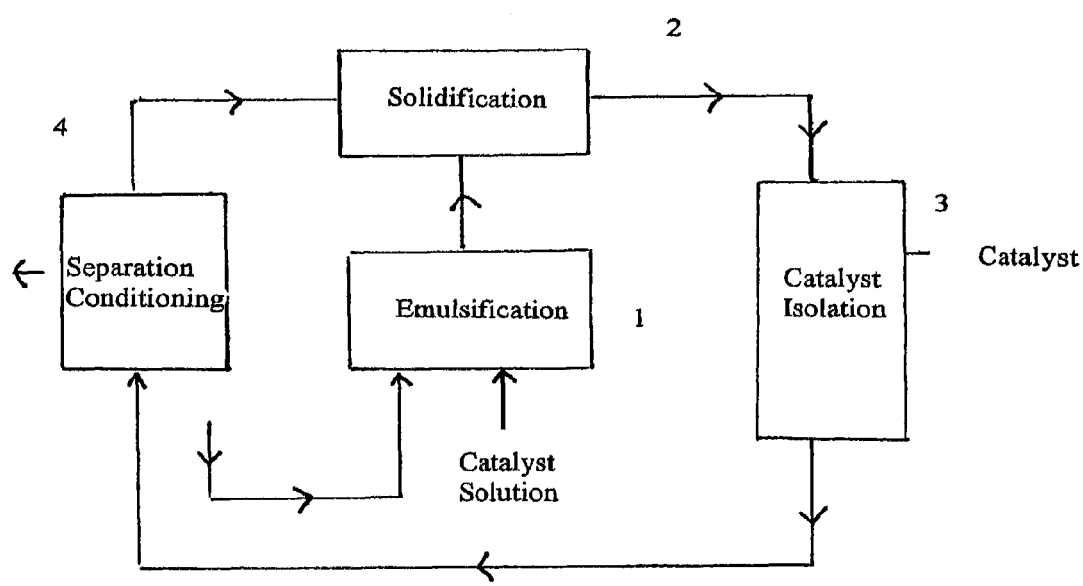
FIG. 1 shows a schematic of the process steps of a catalyst preparation according to the invention.
Figure 2:
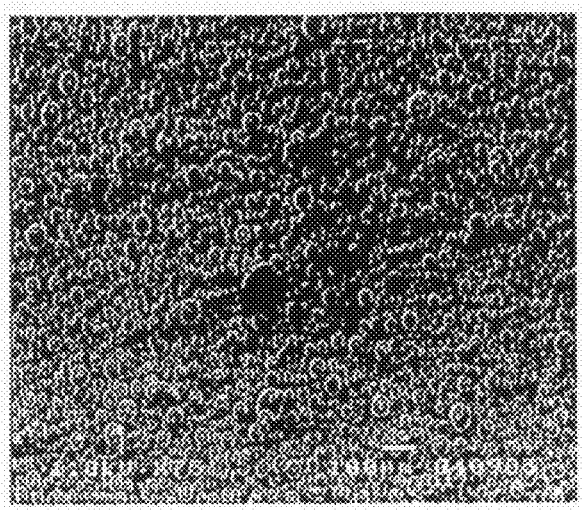
FIG. 2 shows the SEM pictures of the catalyst particles of Example 1

In FIG. 1 the emulsification step (1), where the solution of catalyst component(s) is dispersed in a liquid medium immiscible therewith is followed by the solidification step (2). After step (2) the solid catalyst particles can be isolated (3) from the catalyst suspension. In FIG. 1 step (4) describes an additional step, wherein the solvent for preparing the catalyst solution and the liquid immiscible therewith can be separated and reused and recycled in the process. Step (4) thus forms an optional additional step to the process.

In the emulsification step the continuous phase is mixed with the catalyst phase, i.e. a solution of catalyst components. At low temperature, both of these phases are immiscible with each other at least to the extent that a two phase liquid-liquid emulsion system can be formed. The droplet size distribution of this emulsion can be adjusted by stirring rate and by the use of surfactant(s) and its concentration.

In the solidification step the emulsion is subjected to chemical or physical changes in order to solidify the liquid droplets of the emulsion, after which a solid catalyst dispersion or suspension is obtained.

In the catalyst isolation step, the solid catalyst particles are separated from the continuous phase.

In the separation step the solvent and the liquid immiscible therewith are separated and said solvent and liquid are reused and recycled in the process optionally after conditioning.

Many of these steps can be carried out in different ways using different chemicals and other conditions, which are partly dependent on the catalyst type prepared.

The overall continuous process can be described in more detail as follows:

Catalyst solution containing catalyst components and a solvent (in the following called 'catalyst phase') from the solution vessel and the liquid medium immiscible therewith are pumped to into the emulsification reactor. Further, any additional components needed, e.g. any surfactants, are fed to the reactor separately or together with the catalyst solution or with liquid medium. The volume fraction of the dispersed phase is adjusted by altering the ratio of catalyst phase flow rate to the liquid medium flow rate. For example, if the ratio is desired to be e.g. 1:4, equal to 20 vol-% dispersed phase, then e.g. 10 ml/min catalyst phase and 40 ml/min liquid medium are pumped into the reactor.

Different reactors can be used as emulsification reactors, such as continuous stirred tank reactors, with or without baffles, and having mixers known in the art (e.g. anchor type mixers, pitch blades, turbine or rotor stator mixers). In addition e.g. static mixer in loop set up reactors can be used, or any other suitable disperser where emulsification can be carried out and optionally provided with temperature controlling means, such as e.g. cooling jackets or coils or any other suitable means and optionally with additional thermostats, if needed. The emulsification reactor is preferable operated continuously. The mixing speed may be adjusted to a speed, where the desired emulsification will happen. The residence time is also generally adjustable.

In the continuous process the emulsion formed leaves the emulsification reactor, preferably via a tube, and is introduced into the solidification reactor, such as a stirred tank reactor or a mixing tube, where the solidification happens. Solidification is typically effected by subjecting the emulsion to chemical or physical change(s) in order to change the solubility of the solvent of the dispersed phase used in the emulsion formation in the liquid medium of the continuous phase. This change can be done e.g. by changing the temperature of the emulsion, by diluting the emulsion or by adding any other solubility enhancing agent(s) into the emulsion or by any combination of these methods.

As one preferred embodiment the solidification is carried out in a mixing tube, where the emulsion is contacted with a large amount of additional immiscible liquid medium fed into the tube and having a temperature higher than that of the emulsion. More preferably this step is carried out continuously. The ratio of emulsion flow rate to hot liquid flow rate can vary widely depending on the desired temperature change rate. The change can be done slowly or in rapid way. The aim is that due to the temperature change the solvent of the catalyst solution is extracted into the liquid medium. High velocities and efficient mixing, preferably resulting in turbulent flow, in addition to a high temperature difference between both flows and the significantly larger amount of said liquid medium affect fast solidification. This is primarily due to the fact that the emulsion heats up instantaneously. At the higher temperature, the solvent of the catalyst phase, becomes soluble in the liquid medium and hence is extracted into it. Since the solvent is extracted into the liquid medium, the droplets become solid and the catalyst suspension is formed.

From the solidification step the solidified catalyst suspension obtained is transferred to the isolation step. The catalyst suspension is stable compared to the catalyst emulsion and thus can be handled more easily without deteriorating the catalyst morphology. Isolation of the catalyst particles can be done by any conventional method known in the art. As examples of isolation methods filtration, decanting, centrifuging and flotation methods can be mentioned. Preferably isolation step (c) is carried out continuously.

In one preferred embodiment, which contains the additional step (d), for separating the extracted solvent and liquid medium, the mixture of said liquid medium and solvent is fed, after the isolation of the catalyst, to the separation tank, where the separation is carried out and from there the separated liquid medium may be fed back to the solidification step. Part of the separated liquid medium can also be used in the emulsion formation. The temperature of the liquid medium is increased again e.g. by the aid of heat exchangers before feeding to the solidification step. The separated solvent can be reused in forming the catalyst solution. Preferably step (d) is carried out continuously.

Catalysts

The polymerization catalyst of the invention comprises, as disclosed above, an organometallic compound of a transition metal of Group 3 to 10 of the Periodic Table (IUPAC), or of an actinide or lanthanide. Preferably said transition metal is selected from Groups 4 to 10, more preferably from Groups 4 to 6 of the Periodic Table (IUPAC), most preferably it is Ti, Zr or Hf.

A typical transition metal compound is a compound of formula (I)

$$(L)_m R_n M y_q \tag{I}$$

wherein M is a transition metal as defined above, each Y is independently a σ-ligand, each L is independently an organic ligand which coordinates to M, R is a bridging group linking two ligands L, m is 1, 2 or 3, n is 0 or, when m is 2 or 3, 0 or 1, q is 1, 2 or 3, and m+q is equal to the valency of the metal.

Other types of organometallic compounds of transition metals are halogen containing compounds, such as tetravalent Ti compounds which, together with a compound of a metal of Group 1 to 3 of the Periodic Table, form Ziegler-Natta type catalysts, the preparation of which form a further aspect of the invention. Examples of said Ti compounds are $TiX_4$ (II), where X is halogen, preferably Cl, or $Ti(OR_1)_{4-p}X_p$ (III), where X is as above, $R_1$ is a $C_{1-20}$ hydrocarbyl group, e.g. $C_{2-15}$ group, preferably $C_{3-10}$ group, such as $C_{4-8}$ group, e.g. linear or branched alkyl, aryl, aralkyl, or alkaryl, which may be optionally substituted with halogen and p=0, 1, 2 or 3. Typically the metal of Groups 1 to 3 is of Group 2 and is preferably Mg. Typical Mg compounds have the formula $Mg(OR_1)_{2-n}X_n$ (IV), where $R_1$ and X are as above and n is 0, 1 or 2. X can be replaced by a hydrocarbyl as defined above. Further, complexes of $MgX_2$ with electron donors are possible.

Preferably the transition metal compound is a metallocene or non-metallocene.

In addition to the transition metal compounds the catalyst may contain additional compounds, such as cocatalysts, activators, internal donors, and any reaction products of transition metal compounds and cocatalysts. As typical cocatalysts conventional activators are used, e.g. compounds of Group 13 of the Periodic Table, e.g. organoaluminium compounds, such as alkyl aluminium compounds, e.g. trialkylaluminium, or aluminoxane compounds, which are commonly used with single site catalysts. In addition non-coordination ionic cocatalysts, such as boron activators can be used.

Preferred catalysts prepared according to the process of the invention comprise a metallocene and optionally a cocatalyst. By "metallocene" is meant a η-ligand metal complex.

The process described herein can be employed to manufacture a wide variety of single site catalysts, especially metallocenes. The metallocene compound may have a formula V:

$$(Cp)_m R_n MY_q \quad (V)$$

wherein:

each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. $C_{1-20}$ alkyl, $C_{2-20}$ alkenyl, $C_{2-20}$ alkynyl, $C_{3-12}$ cycloalkyl, $C_{6-20}$ aryl or $C_{7-20}$ arylalkyl), $C_{3-12}$ cycloalkyl which contains 1, 2, 3 or 4 heteroatom(s) in the ring moiety, $C_{6-20}$ heteroaryl, $C_{1-20}$ haloalkyl, —SiR"$_3$, —OSiR"$_3$, —SR", —PR"$_2$ or —NR"$_2$, wherein each R" is independently a hydrogen or hydrocarbyl, e.g. $C_{1-20}$ alkyl, $C_{2-20}$ alkenyl, $C_{2-20}$ alkynyl, $C_{3-12}$ cycloalkyl or $C_{6-20}$ aryl; or e.g. in case of —NR"$_2$, the two substituents R" can form a ring, e.g. five- or six-membered ring, together with the nitrogen atom which they are attached to;

R is a bridge of 1-7 atoms optionally present when m is 2 between two groups Cp, e.g. a bridge of 1-4 C-atoms and 0-4 heteroatoms, wherein the heteroatom(s) can be e.g. Si, Ge and/or O atom(s), whereby each of the bridge atoms may bear independently substituents, such as $C_{1-20}$ alkyl, tri($C_{1-20}$ alkyl)silyl, tri($C_{1-20}$ alkyl)siloxy or $C_{6-20}$ aryl substituents); or a bridge of 1-3, e.g. one or two hetero atoms, such as silicon, germanium and/or oxygen atom(s), e.g. —SiR$^1$$_2$—, wherein each R$^1$ is independently $C_{1-20}$ alkyl, $C_{6-20}$ aryl or tri($C_{1-20}$ alkyl)silyl-, such as trimethylsilyl-;

M is a transition metal of Group 4 to 6, such as Group 4, e.g. Ti, Zr or Hf, each Y is independently a sigma-ligand, such as H, halogen, $C_{1-20}$ alkyl, $C_{1-20}$ alkoxy, $C_{2-20}$ alkenyl, $C_{2-20}$ alkynyl, $C_{3-12}$ cycloalkyl, $C_{6-20}$ aryl, $C_{6-20}$ aryloxy, $C_{7-20}$ arylalkyl, $C_{7-20}$ arylalkenyl, —SR", —PR"$_3$, —SiR"$_3$, —OSiR"$_3$ or —NR"$_2$ wherein each R" is independently hydrogen or hydrocarbyl, e.g. $C_{1-20}$ alkyl, $C_{2-20}$ alkenyl, $C_{2-20}$ alkynyl, $C_{3-12}$ cycloalkyl or $C_{6-20}$ aryl; or e.g. in case of —NR"$_2$, the two substituents R" can form a ring, e.g. five- or six-membered ring, together with the nitrogen atom which they are attached to;

and each of the above mentioned ring moieties alone or as a part of a moiety as the substituent for Cp, Y, R" or R$^1$ can further be substituted e.g. with $C_{1-20}$ alkyl which may contain Si and/or O atoms;

n is 0, 1 or 2, e.g. 0 or 1, m is 1, 2 or 3, e.g. 1 or 2, preferably 2;

q is 1, 2 or 3, e.g. 2 or 3, preferably 2;

wherein m+q is equal to the valency of M.

Other preferred catalysts prepared according to the process of the present invention are known as non-metallocenes wherein the transition metal, preferably a Group 4 to 6 transition metal, suitably Ti, Zr or Hf; has a coordination ligand other than cyclopentadienyl derived ligand.

The term "non-metallocene" herein means compounds, which bear no cyclopentadienyl ligands or fused derivatives thereof, but instead bear one or more non-cyclopentadienyl η- or σ-, mono-, bi- or multidentate ligand. Such ligands can be chosen e.g. from (a) acyclic, η$^1$- to η$^4$- or η$^6$-ligands composed of atoms from Groups 13 to 16 of the Periodic Table (IUPAC), (see e.g. WO 01/70395, WO 97/10248 and WO 99/41290), or (b) cyclic σ-, η$^1$- to η$^4$- or η$^6$-, mono-, bi- or multidentate ligands composed of unsubstituted or substituted mono-, bi- or multicyclic ring systems, e.g. aromatic or non-aromatic or partially saturated ring systems, containing carbon ring atoms and optionally one or more heteroatoms selected from Groups 15 and 16 of the Periodic Table (IUPAC) (see e.g. WO 99/10353). Bi- or multidentate ring systems include also bridged ring systems wherein each ring is linked via a bridging group, e.g. via an atom from Groups 15 or 16 of the Periodic Table, e.g. N, O or S, to the transition metal atom (see e.g. WO 02/060963, WO-A-99/10353 or in the Review of V. C. Gibson et al., in *Angew. Chem. Int. Ed,* 38, 1999, 428-447, or with oxygen-based ligands, (see the review of Gibson et al.). Further specific examples of non-η$^5$ ligands are amides, amide-diphosphane, amidinato, aminopyridinate, benzamidinate, azacycloalkenyl, such as triazabicycloalkenyl, allyl, beta-diketimate and aryloxide. The disclosures of the above documents are incorporated herein by reference.

The preparation of metallocene and non-metallocene compounds (preferably metallocene compounds) usable in the invention is well documented in the prior art and reference is made e.g. to the above cited documents. Some of the compounds are also commercially available. The complexes may therefore be prepared according to, or analogously to, the methods described in the literature, e.g. by first preparing the organic ligand moiety and then metallating said organic ligand with a transition metal. Alternatively, a metal ion of an existing metallocene or non-metallocene compound can be exchanged for another metal ion through transmetallation.

Preferred as cocatalysts for metallocenes and non-metallocenes, if desired, are the aluminoxanes, in particular the $C_{1-10}$ alkylaluminoxanes, most particularly methylaluminoxane (MAO). Such aluminoxanes can be used as the sole cocatalyst or together with other cocatalyst(s). Thus besides, or in addition to, aluminoxanes, other cation complex forming catalyst activators can be used. In this regard mention may be made particularly to boron compounds known in the art. The activators may be commercially available or can be prepared according to the prior art literature.

Further aluminoxane cocatalysts are described in WO-A-94/28034 which is incorporated herein by reference. These are linear or cyclic oligomers having up to 40, preferably 3 to 20-(Al(R''')O)— repeat units (wherein R''' is hydrogen, $C_{1-10}$ alkyl (preferably methyl) or $C_{6-18}$ aryl or mixtures thereof).

The use and amounts of such activators are within the knowledge of a man skilled in the field. As an example, with the boron activators, 5:1 to 1:5, preferably 2:1 to 1:2, such as 1:1, ratio of the transition metal to boron activator may be used. In the case of aluminoxanes, such as methylaluminumoxane (MAO), the amount of Al, provided by aluminoxane, can be chosen to provide an Al:transition metal molar ratio e.g. in the range of 1:1 to 10 000:1, suitably 5:1 to 8000:1, preferably 10:1 to 7000:1, e.g. 100:1 to 4000:1, as normally used for homogeneous catalyst systems, or alternatively 10:1 to 500:1, such as 100:1 to 300:1 as normally used for heterogeneous catalyst systems.

The quantity of cocatalyst to be employed in the catalyst of the invention is thus variable and depends on the conditions and the particular transition metal compound chosen but will be well known to a person skilled in the art. Any additional components to be contained in the solution comprising the catalyst may be added to said solution before or, alternatively, after the dispersing step.

In the first step of a preferred process of the invention a solution of the catalyst component(s) is made by dissolving the components in a solvent or in a mixture of solvents. Preferably all of the components required to make a catalyst are added to the solution. Alternatively only some of the catalyst components may be added to the solution at this stage. When only some of the catalyst components are added at this stage, the remaining components may be added after formation of the emulsion of the solution with the liquid medium immiscible therewith.

The solvent is chosen so that it dissolves said catalyst component(s). The solvent can preferably be an organic solvent selected from linear or branched aliphatic, alicyclic and aromatic hydrocarbons having up to 20 carbon atoms, suitably an aliphatic or aromatic hydrocarbon, optionally containing halogen, e.g. pentane, hexane, heptane, toluene, benzene etc. are preferred. Toluene is one preferred solvent. A mixture of solvents may also be used, provided that said mixture dissolves the catalyst components and is immiscible, as defined below, with the continuous phase at least during the emulsion formation step. The catalyst solution forms the dispersed phase of the emulsion system.

The requirement for the liquid medium forming the continuous phase of the emulsion is that it is immiscible with the catalyst phase. The term immiscible means that the liquid medium is immiscible at least to the extent that an emulsion is formed. In a preferred embodiment of the invention the liquid medium is not miscible with the dispersed phase at the emulsion temperature. Further, depending on the catalyst to be prepared, the liquid medium can take part in the reaction or is inert to the components of the dispersed phase (catalyst solution).

According to the special embodiments of the invention the liquid medium is a fluid or mixtures of fluids which may be used to form the continuous phase, which is inert and immiscible to the catalyst solution. Such fluids preferably include halogenated organic solvents, particularly fluorinated organic hydrocarbons. These hydrocarbons are particularly preferred since they are inert and are substantially immiscible with a range of common organic solvents. In addition other fluids, e.g. oils etc., which fulfill the above requirements can be used.

Suitable fluorinated solvents include semi, highly or perfluorinated solvents or mixtures thereof. Representative examples of solvents are semi, highly or perfluorinated hydrocarbons having up to 30 carbon atoms (e.g. $C_{1-30}$ alkanes and cycloalkanes), preferably up to 20 carbon atoms and more preferably up to 10 carbon atoms. "Semi-fluorinated" hydrocarbons comprise a mixture of C—H and C—F bonds whereas "highly fluorinated" hydrocarbons comprise mainly (e.g. more than 50% of the CH/CF bonds are CF bonds, preferably more than 70%) C—F bonds. In "perfluorinated" hydrocarbons all of the C—H bonds are replaced by C—F bonds. Particularly preferred fluorinated hydrocarbon solvents include perfluorohexane, perfluoroheptane, perfluorooctane and perfluoro(methylcyclohexane). Perfluorooctane is especially preferred.

By the term "emulsion" is meant a multiphasic, i.e. at least two phase emulsion system. The emulsion may be formed by any means known in the art, e.g. by stirring, shaking or sonicating the dispersed phase (e.g. the solution of the catalyst component(s)) with a solvent substantially immiscible therewith. In a preferred embodiment of the present invention the emulsion formation step is carried out in a continuously operated apparatus, as described above. When the emulsion forms, the solution which contains, or will contain, the catalyst/catalyst component(s) forms the dispersed phase, which can also be called the discontinuous phase, and the liquid medium, with which it is immiscible forms the continuous phase.

The dispersed phase will be in the emulsion as liquid droplets, where the catalyst formation occurs.

The ratio of the solution of the catalyst components, e.g. in toluene, and the liquid medium with which it is immiscible, e.g. a fluorinated hydrocarbon, is such that the solution of the catalyst forms the discontinuous phase. Typically the volume dispersed phase is in the range 1 to 50 vol-%, preferably 5 to 40 vol-%, more preferably 10-30 vol-%, most preferably 15-25 vol-%, e.g. 20 vol-% dispersed phase.

Emulsifying agents/emulsion stabilisers may also be used for facilitating the formation and/or stability of the emulsion. For example, surfactants, e.g. surfactants based on hydrocarbons (including polymeric hydrocarbons with a molecular weight e.g. up to 10 000, optionally interrupted with a heteroatom(s)), preferably halogenated hydrocarbons, such as semi-, or highly-fluorinated hydrocarbons optionally having a functional group, or, preferably semi-, highly- or perfluorinated hydrocarbons having a functionalised terminal, can be used. As a reference to the surfactants WO03/051934 is referred to. Surfactants can be included in the dispersed phase or in the continuous phase.

An emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and/or stabiliser in the formed emulsion system.

Examples of the surfactant precursors usable for forming said reaction product include e.g. known surfactants which bear at least one functional group selected e.g. from —OH, —SH, —NH$_2$, —COOH, —COONH$_2$, oxides of alkenes, oxo-groups and/or any reactive derivative of these groups, e.g. semi-, highly or perfluorinated hydrocarbons bearing one or more of said functional groups. Preferably, the surfactant precursor has a terminal functionality as defined above.

The droplet size and size distribution of the formed dispersed phase can be selected or controlled in a manner known in the art, for example, by the choice of the device for emulsion formation and by the energy put into the emulsification. This, advantageously, may also allow for the size of the catalyst particles to be controlled. For instance, larger droplets of discontinuous phase will generally give rise to larger catalyst particles than smaller droplets. The droplet size needed to obtain any particular catalyst particle size may be readily deduced by the skilled man in the art.

Emulsion preparation in general is common knowledge. As one alternative for preparing an emulsion the dispersed phase (catalyst solution) and continuous phase (liquid medium) can be added into the emulsifier in conditions, where they form a homogeneous phase. An emulsion is formed when this homogeneous system is converted into a non-homogeneous system (e.g. at least a biphasic system) e.g. by changing the temperature of the system. This method is particularly preferred when an aromatic solvent is used to form the solution of the catalyst component(s) and a perfluorinated liquid medium as hereinbefore defined is used as the continuous phase. Regardless of the method used to form the emulsion, its temperature prior to step (b) is −20 to +50° C., preferably −10 to +40° C., more preferably −5 to 30° C., and most preferably 0 to 20° C.

In the second step of the process of the invention the catalyst is solidified from the droplets of the dispersed phase. According to the invention it is preferable to carry out this step continuously. During the solidification the solubility of the solvent of the dispersed phase used in emulsion formation in the continuous phase is increased. This change can be done e.g. by changing the temperature of the emulsion, by diluting the emulsion or by adding any other solubility changing agent into the emulsion or by any combinations of these methods.

Other alternatives to affect solidification are prepolymerisation reaction within said dispersed phase, cross-linking (e.g. partially or fully) the catalyst within said dispersed phase by adding a cross-linking agent; and inducing a chemical reaction within the dispersed phase which causes solid catalyst particles to solidify. A preferred method in a continuous process is to use the temperature change method.

In said preferred embodiment solidification is affected by subjecting the emulsion to a temperature change. More preferably the emulsion is subjected to a temperature change e.g. >2° C./min, preferably >10° C./min, still more preferably >30° C./min, and still more preferably >30° C./s. The rate of the temperature change depends on whether more or less rapid temperature change is desired. According to one embodiment the temperature change is selected so that it is capable of causing instant solidification of the catalyst. By "instant solidification" is meant that solidification occurs within 0.01 to 5 seconds, preferably 0.05 to 1 second of exposure to the means by which the temperature change is to be affected. In one embodiment the emulsion is diluted by an additional amount of liquid medium before subjecting it to the solidification step.

The appropriate temperature change in the emulsion required to achieve solidification will depend on the nature of the emulsion, any additional components present such as surfactants, the quantity of emulsion involved and/or the means by which the temperature change is affected. Typically, however, the temperature change required to bring about solidification of the catalyst will be 5 to 100° C., preferably 10 to 80° C., more preferably 20 to 60° C., e.g. 40 to 60° C., such as about 50° C.

In a preferred embodiment the temperature change is obtained by exposing the emulsion to an environment having a different temperature. Preferably the environment to which the emulsion is exposed is hotter than the emulsion. Thus preferably the environment to which the emulsion is exposed has a temperature which is at least 10 to 150° C., preferably 20 to 120° C., more preferably 30 to 100° C., e.g. 50 to 80° C., such as about 70° C. higher than that of the emulsion. As mentioned above, in a particularly preferred process the emulsion may be prepared at a low temperature and/or cooled to increase the temperature difference between the emulsion and the environment to which it is exposed.

In a particularly preferred process of the invention the environment having a different temperature comprises a liquid, in which the catalyst is substantially insoluble, whereby the heat is transferred via convection. During the solidification the emulsion is preferably contacted with a large surplus of said liquid, in order to achieve a fast convective heat transport and thus a fast heat up of the emulsion, which leads to effective extraction of the solvent of the catalyst phase (catalyst droplets) to the receiving liquid and thus to effective solidification. As a result, a solid catalyst dispersion/suspension is obtained. This dispersion is much more stable compared to the emulsion and is thus easy to handle in any further handling or transporting steps.

Particularly preferred mediums for use as the temperature changing liquid include those used as the continuous phase in step (a) of the process hereinbefore described. Still more preferably the medium used as the temperature changing liquid is the same solvent used in step (a) as the continuous phase. Preferred mediums therefore include perfluorohexane, perfluoroheptane, perfluoro(methylcyclohexane) and especially perfluorooctane.

In one preferred embodiment the solidification step is carried out in a continuously operated mixing tube, where the emulsion is contacted with a temperature changing liquid as described above. By a "mixing tube" is meant a reactor in which a flow of temperature changing liquid can be generated to cause mixing of any components added thereto and, at the same time, transport the added components to an outlet. Operating the system in a continuous way allows all particles to be exposed to the same conditions and surrounded by same environment, i.e. no temporal differences in e.g. temperature or chemical environment occurs, which is a requirement for getting uniform product. The flow ratio between the temperature changing liquid and the emulsion in the mixing tube is high enough in order to get efficient solidification. This ratio is naturally dependent on the solvents and the liquid medium, e.g. on the solubility properties of these. This ratio (vol/vol) is in the range of 1000:1-1:1, preferably 500:1-1:1, more preferably 300:1-1:1, still more preferably 100:1-1:1, especially preferably 70:1-3:1, e.g. 50:1-5:1 or 20:1-5:1.

More preferably the flow velocity of the temperature changing liquid in the mixing tube is sufficient to cause turbulent flow. By "turbulent flow" is meant a flow in which irregular random motion of fluid particles in directions transverse to the direction of the main flow occur. Under these conditions, the solidification process can occur extremely quickly (e.g. instantaneously) since heat transfer between the emulsion and the temperature changing liquid occurs rapidly. Also the higher temperature of the temperature changing liquid increases the solubility of the solvent of the dispersed phase in the continuous phase. As a result, said solvent is very efficiently stripped or extracted into the liquid medium and the catalyst leaving the tube is in the form of solid particle dispersion. For example, the flow velocity of the liquid in the mixing tube is in the range 0.1 to 10 m/s, preferably 0.2 to 5 m/s, more preferably 0.5 to 2 m/s. However, it should be noted that these ranges are examples of velocities and can vary depending on the solidification reactor type and size.

The solid catalyst particles which emerge in the outflow of the continuous apparatus may be separated and recovered by any procedure known in the art from the catalyst suspension. For example, the outflow from the continuous apparatus may be filtered, preferably using an in-line filtration system. Other commonly known methods for isolating are decanting, centrifuging and flotation. In a particularly preferred process of the invention isolation of the catalyst also occurs continuously. The catalyst may then be optionally washed and/or dried to remove any solvent residuals present in the particles. The washing and/or drying of the catalyst particles may be carried out in any manner conventional in the art.

According to a still more preferred embodiment of the invention the process comprises an additional step, where the solvent extracted from the dispersed phase to the continuous phase (liquid medium) is separated from the liquid medium and reused in the formation of the catalyst solution. Further, the liquid medium is recycled mainly to the solidification step. A smaller part of it can be reused in the emulsification step as well.

The separation of said solvent, e.g. toluene, from the liquid medium, e.g. perfluorooctane can be carried out by using a method, wherein the homogeneous liquid system is changed to a liquid/liquid emulsion comprising at least two phases, from which the separated liquids are easily removed by methods known in the art. Said change can be done e.g. by cooling down the fluid, whereby said solvent and said liquid medium are separated from each other. Alternatively the separation can be done e.g. by distillation.

In one preferred process the separation is done continuously by phase separation in a separation tank, i.e. cooling down the mixture to a temperature, where the solvent becomes insoluble to the liquid medium. A temperature of about 10° C. in the case of a toluene/perfluorooctane system is appropriate to induce the separation to happen.

Following the separation the liquid medium (continuous phase) may be re-used to form the emulsion and/or as the temperature changing liquid in the solidification step. If re-used to form the emulsion the liquid medium is preferably cooled or further cooled, e.g. to a temperature of 0 to 5° C. In contrast if re-used as the temperature changing liquid in the solidification step, the liquid medium is preferably heated at least to 50° C., preferably at least to 60° C. and more preferably at least to 80° C. Typically at least 50%, preferably at least 90% or even more than 95% of the total amount of liquid medium separated from solvent/liquid medium mixture is re-used to form the emulsion and as the temperature changing liquid in the solidification step. The re-use of the separated solvent and liquid medium in this way also represents a considerable cost saving.

The solid particles obtained from the process of the invention may have an average size range of 1 to 500 µm, particularly 5 to 500 µm, advantageously 5 to 200 µm, e.g. 10 to 100 µm, or even 10 to 50 µm. Advantageously the size can be controlled by varying the size of the droplets of dispersed phase obtained during the emulsification step. From the figures it can be seen that a narrow particle size distribution of the catalyst is obtained by the process of the invention.

The present method may also enable catalyst particles with high catalytic activity to be prepared. Catalyst particles have uniform morphology, they are nicely spherical in shape, they have high bulk density and high loading. And as is clearly disclosed above, they do not contain any external carrier. Further, the catalyst particles obtained have very low porosity and a low surface area, e.g. of less than 100 $m^2/g$, preferably less than 50 $m^2/g$ and more preferably less than 20 $m^2/g$, or even below 5 $m^2/g$, measured by the BET-method.

By use of the process of the present invention the catalyst particles may be obtained in much greater quantities in any given time compared to a batch process and with a much smaller apparatus system. The time taken for transfer of material between reactors may be reduced and/or the need to store material in holding tanks is avoided, which steps would also deteriorate the quality of the catalyst. Catalyst particles may therefore be produced much more economically, especially on a commercial scale where even small increases in efficiency result in large cost savings.

The catalyst particles obtained by the process of the present invention are highly homogenous in respect of their morphological characteristics (i.e. catalyst particles obtained by the process of the invention display a high level of consistency in their characteristics), as disclosed above. Due to the replica effect the polymers produced by using the catalyst produced by the process of the invention have the same kind of uniform particle morphology.

The catalyst system of the invention can be used alone or together with an additional cocatalyst(s) in the actual polymerisation step in a manner known in the art.

The olefin to be polymerised using the catalyst system of the invention can be any olefin polymerisable in a coordination polymerisation including an alpha-olefin alone or as a mixture with one or more comonomers. Preferred olefins are ethylene or propene, or a mixture of ethylene or propene with one or more alpha-olefin(s). Preferred comonomers are $C_{2-12}$ olefins, preferably $C_{4-10}$ olefins, such as 1-butene, isobutene, 1-pentene, 1-hexene, 4-methyl-1-pentene, 1-heptene, 1-octene, 1-nonene, 1-decene, as well as diene, such as butadiene, 1,7-octadiene and 1,4-hexadiene, or cyclic olefins, such as norbornene, and any mixtures thereof.

Polyethylene and any copolymers thereof are particularly contemplated.

Furthermore, the catalyst system of the invention can be used for the polymerisation of long chain branched alpha-olefins (with 4 to 40 C atoms), alone or together with short chain branched alpha-olefins.

Polymerisation may be effected in one or more, e.g. one, two or three polymerisation reactors, using conventional polymerisation techniques, in particular gas phase, solution phase, slurry or bulk polymerisation. Polymerisation can be a batch or continuous polymerisation process. Generally a combination of slurry (or bulk) and at least one gas phase reactor is preferred, particularly with gas phase operation coming last.

For slurry reactors, the reaction temperature will generally be in the range of 60 to 115° C., e.g. 80-110° C.), the reactor pressure will generally be in the range 5 to 80 bar, e.g. 50-60 bar), and the residence time will generally be in the range of 0.3 to 5 hours, e.g. 0.5 to 2 hours. The diluent used will generally be an aliphatic hydrocarbon having a boiling point in the range −70 to +100° C. In such reactors, polymerisation may, if desired, be effected under supercritical conditions.

For gas phase reactors, the reaction temperature used will generally be in the range 60 to 110° C. (e.g. 70 to 95° C.), the reactor pressure will generally be in the range 10 to 25 bar, and the residence time will generally be 1 to 8 hours. The gas used will commonly be a non-reactive gas such as nitrogen or propane together with monomer (e.g. ethylene or propylene).

Generally the quantity of catalyst used will depend upon the nature of the catalyst, the reactor types and conditions and the properties desired for the polymer product. Conventional catalyst quantities, such as described in the publications referred to herein, may be used.

With the method of the invention a polyolefin with a high bulk density and a good uniform morphology is obtained as hereinbefore described.

The invention will now be described in more detail by way of the following non-limiting Examples and with reference to the accompanying FIGS. 1 to 7.

EXAMPLE 1

Complex Preparation 264 mg of rac-dimethylsilanediyl-bis(2-methyl-4-phenyl-indenyl)zirconium dichloride (97 wt.-%, purchased from Catalytica Advanced Technologies) were reacted with 20 ml MAO solution, 30 wt.-% in toluene (purchased from Albemarle) under stirring at room temperature in a septa bottle for 30 minutes. A red solution of activated complex (with target Al/Zr=200) was obtained (solution 1).

Surfactant Preparation 0.5 ml of 1H,1H,7H-perfluoroheptan-1-ol (Apollo Scientific, UK) were added slowly to 2.5 ml MAO under stirring. A vigorous reaction with liberation of gas occurred. After 15 minutes, an additional 2.5 ml of MAO were added to the solution. No visible reaction was observed while stirring for additional 15 minutes. The resulting surfactant solution was transferred into the septa bottle with solution 1.

Continuous Operation

Emulsification

As emulsion reactor, a continuous stirred tank reactor (volume approx. 400 ml) made of glass and equipped with 4 baffles, a rotor stator system and a cooling jacket was used.

The temperature in the reactor was adjusted to approx. +6° C. via a cryostat connected to the reactors cooling jacket.

The reactor was (partly) filled by pumping cold (+3° C.) perfluorooctane from a PFO storage tank (98% purchased from P&M Invest, Moscow, Russia, total amount of PFO in the setup about 4 l, bubbled with $N_2$ prior to use in order to remove oxygen traces).

Under stirring, the complex/MAO solution mentioned above was added batch-wise to the reactor via a syringe. Emulsification of the two immiscible phases (complex/MAO/toluene and PFO) was done using the rotor-stator mixer operated at 4500 RPM leading to a tip speed of about 4.7 m/s.

Solidification

The resulting emulsion was continuously pressed out from the emulsion reactor to a solidification tube via a dip tube (Teflon, inner diameter 3 mm) by pumping in additional cold PFO from the PFO storage tank with a pump. The initial flow rate of cold PFO was 100 ml/min, but due to the build up of pressure in the emulsion reactor the flow rate was later reduced to 50 ml/min.

In the solidification tube, the emulsion was mixed with a flow of hot (+50° C.) perfluorooctane—flow approx. 0.35 l/min (adjusted via pump), temperature in steady state approx. +50° C. (adjusted via a thermostat) in turbulent conditions. Due to the good mixing conditions, the high temperature, and the much higher flow of hot perfluorooctane the emulsion heated up instantly. At these higher temperatures, the toluene solvent becomes soluble in the perfluorooctane and is extracted from the droplets to the continuous perfluorooctane phase. Solid catalyst particles are formed.

Filtration

The thus prepared catalyst dispersion flows to a filter.

In the filter, the catalyst particles are isolated from the flow and remain in the filter, while the circulating PFO flows to a heat exchanger.

Toluene Separation and Conditioning of PFO

The flow of hot PFO coming from the filter is cooled down in heat exchangers and flows into a PFO storage tank. The temperature in said tank in steady state was adjusted to 3° C. via a cryostat connected to the heat exchanger.

At this low temperature toluene becomes insoluble in perfluorooctane and separates as fluid layer on top of the perfluorooctane, from where it is removed.

The experiment was stopped by stopping the pumps, when the emulsion reactor had been nearly emptied from complex/MAO solution. This is visible by a colour change from red to transparent. The total running time was about 10 minutes.

Catalyst Isolation and Drying

Figure 3:
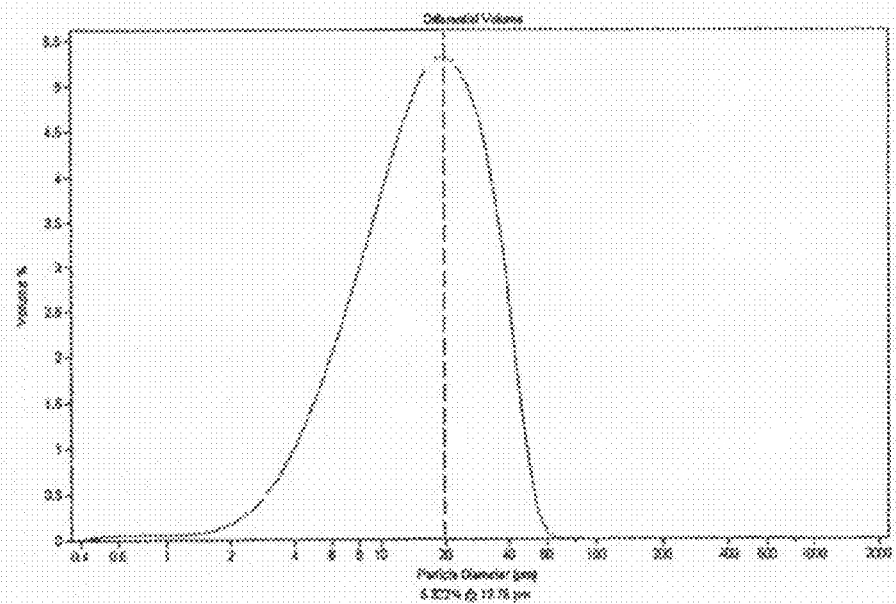
FIG. 3 shows the particle size distribution of the catalyst of Example 1

After shutting down the circulation flow, perfluorooctane was pressed out from the filter with $N_2$ overpressure and the catalyst remaining in the reactor was dried at room temperature for 2 days. Yield of the catalyst preparation was 2.6 g Catalyst Characterization SEM picture shows spherical particles, see FIG. 2:

Particle size distribution was analyzed by Coulter-counter, see FIG. 3:

EXAMPLE 2

The complex and surfactant were prepared as in example 1.

Continuous Operation

The process of example 1 was repeated with the exception that some minor changes in temperature were done.

Emulsification

The same reactor as in example 1 was used. The temperature in the reactor was adjusted to approx. +4° C. via a cryostat connected to the reactor's cooling jacket.

The reactor was (partly) filled by pumping cold perfluorooctane from the PFO storage tank.

Under stirring, the complex/MAO solution mentioned above was added batch-wise to the reactor via a syringe.

Emulsification of the two immiscible phases (complex/MAO/toluene and PFO) was done by the rotor-stator mixer operated at 4500 RPM leading to a tip speed of about 4.7 m/s.

Solidification

The resulting emulsion was continuously pressed out from the emulsion reactor to a solidification tube via a dip tube by pumping in additional cold PFO from the PFO tank with the pump (flow rate used was 50 ml/min).

In the solidification tube, the emulsion was mixed with a flow of hot perfluorooctane—flow of approx. 0.35 l/min, temperature in steady state approx. +49° C. in turbulent conditions. Solid catalyst particles were formed instantly.

Filtration

The thus prepared catalyst dispersion flows to the filter.

In the filter, the catalyst particles are isolated from the flow and remain in it while the circulating PFO flows to heat exchangers.

Toluene separation and conditioning of PFO

The flow of hot PFO coming from the filter is cooled down in the heat exchangers and flows into a PFO storage tank. The temperature in the tank in steady state was adjusted to 2.5° C. via a cryostat connected to a heat exchanger.

At this low temperature toluene becomes insoluble in perfluorooctane and separates as fluid layer on top of the perfluorooctane.

The experiment was stopped by stopping the pumps after 10 minutes runtime.

Catalyst Isolation and Drying.

After shutting down the circulation flow, perfluorooctane was pressed out from the filter with $N_2$ overpressure and the catalyst remaining in the reactor was dried at room temperature over a weekend. Yield of the catalyst preparation: was 4.33 g.

Catalyst Characterization

Figure 4:
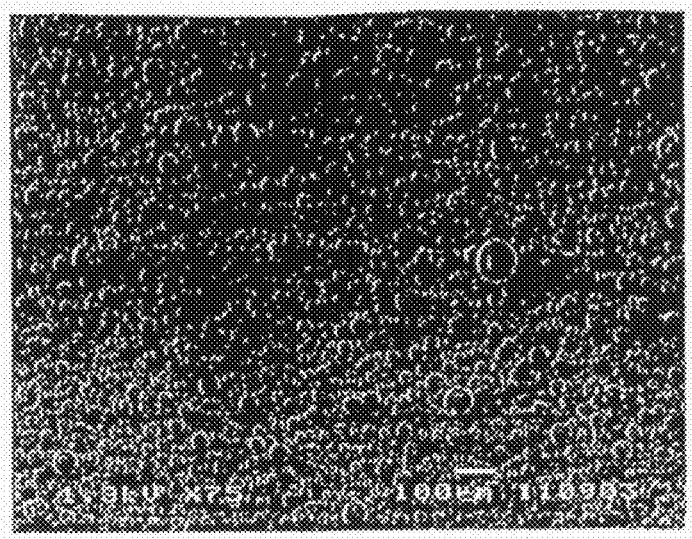
FIG. 4 shows the SEM pictures of the catalyst particles of Example 2

SEM picture shows spherical particles, see FIG. 4.

Figure 5:
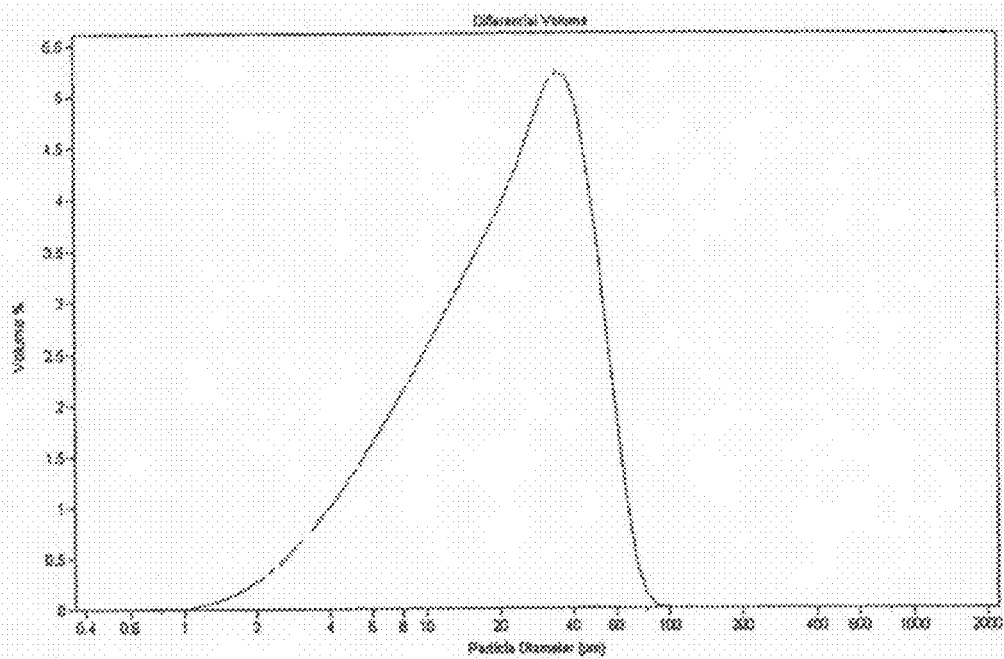
FIG. 5 shows the particle size distribution of the catalyst of Example 2
Figure 6:
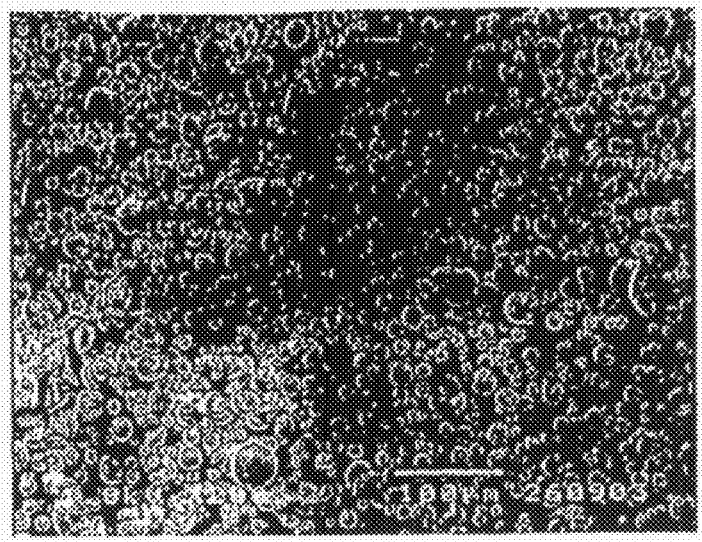
FIG. 6 shows the SEM pictures of the catalyst particles of Example 3

Particle size distribution analyzed by Coulter-counter, see FIG. 5.

Test Polymerisation

A 5 litre stainless steel reactor was used for propylene test polymerisations. 1100 g of liquid propylene was fed to reactor. 0.1 ml triethylaluminum was fed as a scavenger and 15 mmol hydrogen as chain transfer agent. The reactor temperature was set to 30° C. 20 mg catalyst was flushed into the reactor with nitrogen overpressure. The reactor was heated up to 70° C. in a period of about 14 minutes. Polymerisation was continued for one hour at 70° C. Afterwards propylene was flushed out and the polymer was dried and weighted.

Catalyst activity was 16.35 kg/g catalyst/h

EXAMPLE 3

The complex and surfactant were prepared as in example 1.

Continuous Operation

Emulsification

As emulsion reactor, a continuous working chamber for the rotor stator stirrer (volume approx. 70 ml) made of steel and equipped with a cooling coil attached to chamber wall was used. The reactor was cooled to −10° C. in the cooling coil.

The reactor was filled by pumping in cold perfluorooctane from a PFO storage tank and complex/MAO solution pumped in continuously from a septa bottle by an additional metering pump.

Emulsification of the two immiscible phases (complex/MAO/toluene and PFO) was done by the rotor-stator mixer operated at 4000 RPM leading to a tip speed of about 4.17 m/s.

The emulsification chamber was operated fully filled.

Solidification

The emulsion prepared above was continuously pressed out from the reactor to a solidification tube via a dip tube (Teflon, inner diameter 3 mm) and continuously pumping in cold PFO and complex/MAO solution. Flow rates were approx. 17 ml/min PFO and 5 ml/min MAO/complex solution. After some time, PFO flow was lowered to approx. 13 ml/min.

In the solidification tube, the emulsion was mixed with a flow of hot perfluorooctane—flow approx. 0.35 l/min (adjusted via a pump), temperature in steady state approx. +49° C. in turbulent conditions. Solid catalyst particles were formed instantly.

Filtration

The thus prepared catalyst dispersion flows to a filter.

In the filter, the catalyst particles are isolated from the flow and remain in the filter while the circulating PFO flows to heat exchangers.

Toluene Separation and PFO Conditioning

The flow of hot PFO coming from the filter is cooled down in heat exchangers and flows into a PFO storage tank. The temperature in the tank in steady state was adjusted to −1.5° C. via a cryostat connected to a heat exchanger. Toluene separated in the tank as a fluid layer on top of the perfluorooctane.

After approx. 10 minutes the MAO/complex bottle was empty and the run was continued by pumping only cold PFO into the reactor in order to empty it of complex MAO. Total runtime was approx. 20 min.

Catalyst Isolation and Drying

After shutting down the circulation flow, perfluorooctane was pressed out from the filter with $N_2$ overpressure and the catalyst remaining in the reactor was dried at room temperature for 2.5 hours. Yield of the catalyst preparation: 13.2 g Catalyst Characterization SEM picture shows spherical particles, see FIG. 6.

Figure 7:
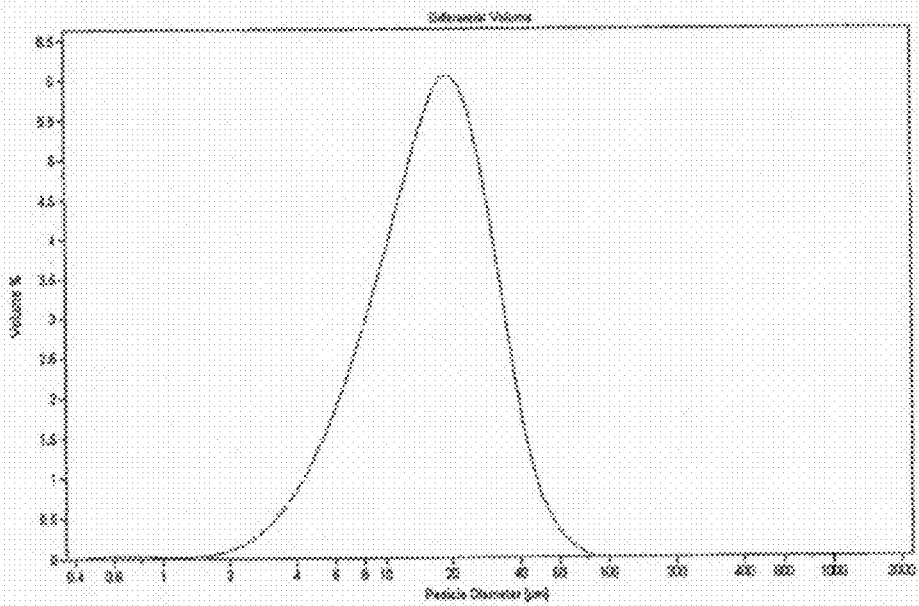
FIG. 7 shows the particle size distribution of the catalyst of Example 3

Particle size distribution analysed by Coulter-counter, see FIG. 7.

Test Polymerisation

A 5 litre stainless steel reactor was used for propylene test polymerisations. 1100 g of liquid propylene was fed to reactor. 0.1 ml triethylaluminum was fed as a scavenger and 15 mmol hydrogen as chain transfer agent. The reactor temperature was set to 30° C. 20 mg catalyst was flushed into the reactor with nitrogen overpressure. The reactor was heated up to 70° C. in a period of about 14 minutes. Polymerisation was continued for one hour at 70° C. Afterwards propylene was flushed out and the polymer was dried and weighed.

Catalyst activity was 22.2 kg/g_catalyst/h.

The invention claimed is:

1. A process for the preparation of olefin polymerisation catalyst comprising an organometallic compound of a transition metal of Group 3 to 10 of the Periodic Table (IUPAC), or of an actinide or lanthanide, in the form of solid particles comprising:
   (a) preparing a liquid/liquid emulsion comprising at least two phases, wherein a solution of catalyst component(s) in a solvent forms the dispersed phase in the form of droplets and a liquid medium immiscible therewith forms the continuous phase; said continuous phase being inert to the components of the catalyst solution;
   (b) solidifying said droplets from said dispersed phase, and optionally
   (c) isolating said catalyst,
   wherein at least step (b) is carried out continuously.

2. A process as claimed in claim 1, wherein step (a) is carried out continuously.

3. A process as claimed in claim 1, wherein steps (a) and (b) are carried out continuously.

4. A process as claimed in claim 1, wherein each of steps (a), (b) and (c) is carried out continuously.

5. A process as claimed in claim 1, wherein the transition metal is of Group 4 to 6 of the Periodic Table (IUPAC).

6. A process as claimed in claim 1, wherein the transition metal compound is a compound of formula (I):

$$(L)_m R_n MX_q \quad (I)$$

wherein M is a transition metal as defined in claim 1 or 6; each X is independently a σ-ligand; each L is independently an organic ligand which coordinates to M; R is a bridging group linking two ligands L; m is 1, 2, or 3; n is 0 or, when m is 2 or 3, 0 or 1; q is 1, 2, or 3; and m+q is equal to the valency of the metal.

7. A process as claimed in claim 1, wherein the catalyst is a single-site catalyst comprising a metallocene and optionally a cocatalyst.

8. A process as claimed in claim 1, wherein the catalyst additionally comprises a compound of a metal of Group 1 to 3.

9. A process as claimed in claim 1, wherein said solvent forming the dispersed phase is an organic solvent selected from a linear or branched aliphatic, alicyclic and an aromatic hydrocarbon having up to 20 carbon atoms optionally containing a halogen, and mixtures thereof.

10. A process as claimed in claim 1, wherein said solvent forming the dispersed phase is an aromatic hydrocarbon.

11. A process as claimed in claim 1, wherein said liquid medium forming the continuous phase is immiscible with said solution at least to the extent that an emulsion is formed.

12. A process as claimed in claim 1, wherein said liquid medium forming the continuous phase is substantially immiscible with said solution at the emulsion conditions.

13. A process as claimed in claim 1, wherein said liquid medium comprises a fluid or mixtures thereof which are inert towards the components of the dispersed phase.

14. A process as claimed in claim 1, wherein said liquid medium comprises a fluorinated hydrocarbon, a functionalized derivative thereof or mixtures thereof.

15. A process as claimed in claim 1, wherein said liquid medium comprises a perfluorinated hydrocarbon having up to 30 carbon atoms.

16. A process as claimed in claim 1, wherein an emulsifying agent is present during preparation of said liquid/liquid emulsion in step (a).

17. A process as claimed in claim 16, wherein said emulsifying agent is a surfactant based on hydrocarbons, preferably halogenated hydrocarbons.

18. A process as claimed in claim 16, wherein said emulsifying agent is a reaction product of a surfactant precursor bearing at least one functional group with a compound reactive with said functional group, said compound being present in the catalyst solution or in the solvent forming the continuous phase.

19. A process as claimed in claim 1, wherein the temperature of the emulsion prior to solidification step (b) is −20 to 50° C.

20. A process as claimed in claim 1, wherein solidification is carried out by changing the solubility of the solvent of the dispersed phase in the liquid medium.

21. A process according to claim 20, wherein the solubility is changed by subjecting the emulsion to a temperature change, by diluting the emulsion or by adding a solubility enhancing agent to the emulsion or any combination thereof.

22. A process as claimed in claim 21, wherein said solidification is effected by subjecting the emulsion to a temperature change.

23. A process as claimed in claim 22, wherein said temperature change is effected by contacting said emulsion with a temperature changing liquid.

24. A process as claimed in claim 23, wherein said temperature changing liquid is the same as the liquid medium used in emulsion formation.

25. A process as claimed in claim 23, wherein the temperature of the temperature changing liquid is 10 to 150° C. higher than that of the emulsion.

26. A process as claimed in claim 22, wherein during the temperature change the temperature of the emulsion is changed 5 to 100° C.

27. A process as claimed in claim 22, wherein the temperature of the emulsion increases more than 2° C./min.

28. A process as claimed in claim 20, wherein the solvent of the dispersed phase is extracted into the liquid medium causing solidification of the droplets of the dispersed phase thereby forming a catalyst suspension.

29. A process as claimed in claim 1, wherein the solidification step is carried out in a continuously operated solidification reactor.

30. A process as claimed in claim 29, wherein said reactor is a stirred tank mixer or a mixing tube, preferably a mixing tube.

31. A process as claimed in claim 20, wherein the flow ratio (vol/vol) of the temperature changing liquid and the emulsion in the solidification reactor is in the range of 1000:1-1:1.

32. A process as claimed in claim 1, wherein the solidification step (b) is effected by diluting the emulsion with said liquid medium.

33. A process as claimed in claim 1, wherein the solidified catalyst droplets are isolated from the catalyst suspension.

34. A process as claimed in claim 1, wherein the isolation is carried out by filtration, decanting, centrifuging, flotating or any other common isolation method.

35. A process as claimed in claim 1, wherein the process further comprises step (d) wherein the solvent of the dispersed phase extracted into the continuous phase is separated out from said continuous phase.

36. A process according to claim 35, wherein the separation is done by changing the homogeneous solvent-continuous liquid into a liquid/liquid heterogeneous system and separating the liquids or by distillation.

37. A process according to claim 35, wherein the separation is carried out continuously by cooling down the solvent-continuous liquid, whereby said solvent and continuous phase are separated.

38. A process according to claim 35, wherein said separated continuous phase is recycled to said emulsion formation step and/or to said solidification step.

* * * * *